W. N. BAER.
DETACHABLE BODY LOCK.
APPLICATION FILED JUNE 9, 1919.
1,344,572.  Patented June 22, 1920.
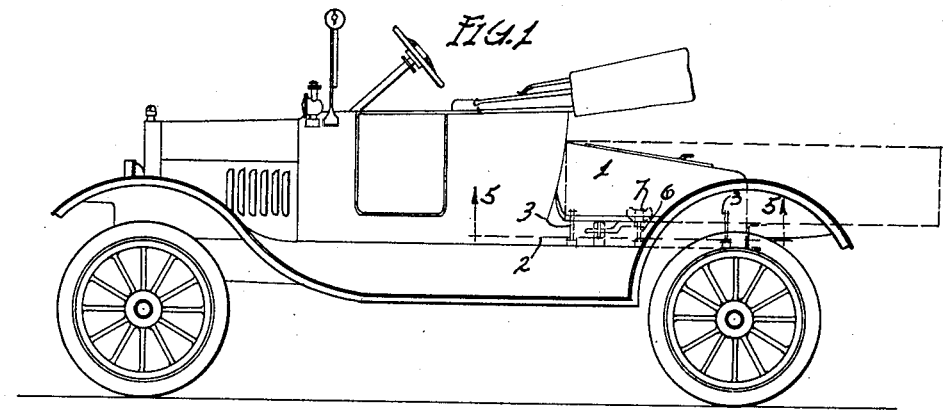
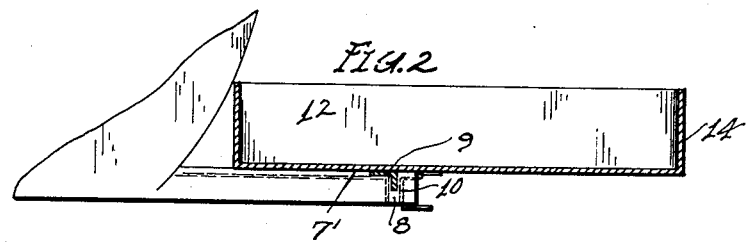
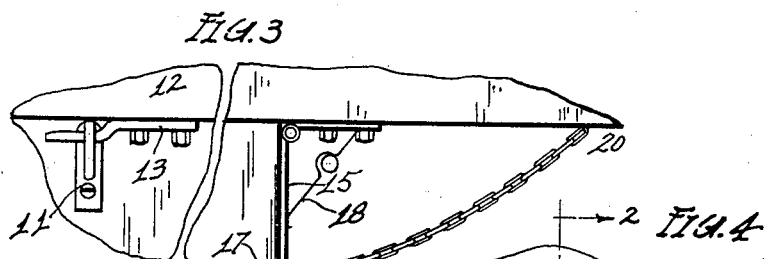
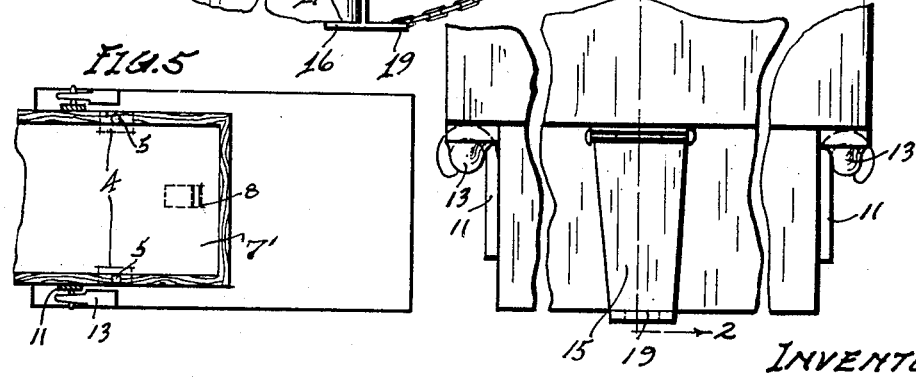
INVENTOR
WILLIAM N BAER
BY C. D. Enochs
ATTORNEY

UNITED STATES PATENT OFFICE.

WILLIAM N. BAER, OF WHITE BEAR, MINNESOTA.

DETACHABLE-BODY LOCK.

1,344,572.  Specification of Letters Patent.  Patented June 22, 1920.

Application filed June 9, 1919. Serial No. 302,961.

*To all whom it may concern:*

Be it known that I, WILLIAM N. BAER, a citizen of the United States, and a resident of White Bear, in the county of Ramsey and State of Minnesota, have invented certain new and useful Improvements in Detachable-Body Locks, of which the following is a specification.

One object of my invention is to provide in a device of the class described means whereby a truck body or box may be readily attached to or removed from automobiles such as the Ford.

Another object is to provide with the chassis of an automobile and a truck body or box easily engageable fingers and a locking member so the box and chassis may be quickly and readily joined.

Another object is to provide means for quickly fastening or unfastening the pan or cover ordinarily provided on runabout cars of that class known as the Ford.

With these and incidental objects in view, the invention consists of certain novel features of construction and combination of parts, the essential elements of which are hereinafter described with reference to the drawing which accompanies and forms a part of this specification.

In the drawing, Figure 1 is a side elevation of an automobile showing in dotted lines the manner in which my improved attachment is used; Fig. 2 is a section taken on the line 2—2, Fig. 4; Fig. 3 is an enlarged side elevation detail of a portion of my improved body lock; Fig. 4 is a rear view and Fig. 5 is a section taken on the line 5—5, Fig. 1.

The class of automobiles such as the Ford, in the runabout type, is ordinarily provided with a cover or pan 1, Fig. 1, clamped or held to the chassis 2 by four bolts 3.

In order to make this pan readily movable I prefer to remove these bolts 3, to fasten to the chassis of the car a pair of plates 4 having tapped holes 5 therein to receive the bolt 6 provided with a butterfly head 7 so that by means of these two bolts the pan 1 may be securely joined to the chassis of the car.

In the class of automobile such as the Ford, when the pan 1 is removed to prepare the chassis for my improved body lock there is exposed a platform of floor members 7', covered with a light sheet steel, and I cut out at 8 an aperture as at 10 so as to reinforce the walls thereof against wear of the lip of the angle piece 9.

I then attach to the side members a pair of hooks 11 and to the box 12 a pair of fingers 13 adapted to engage with the hooks 11.

With this construction by tipping the end 14 of the box slightly upward the fingers 13 can be readily engaged in the hooks 11 and the lip of the angle piece 9 dropped into the reinforced aperture 8, thus holding the box 12 securely in place on the chassis of the car, except for upward tilting of the rear end of the box.

To secure the box from tilting I mount a hinge 15 to the bottom of the box and this hinge has a lip 16 which fits snugly under the rear of the chassis at 17.

A spring 18 is provided to normally hold this lip in its proper position and it is apparent that this lip will absolutely prevent the upward tilting of the end of the box.

The swinging end of the hinge is T shaped and to the portion 19 I prefer to fasten a loose chain which is carried back and attached to the body at 20 so a person can release the hinge, lift the end 14 of the box upward so as to free the lip of the angle piece 9 from its aperture and then draw the fingers 13 from out of engagement with the hooks without having to get under the body.

Automobiles of this type are used by a great many people both as a business car and a pleasure car, and while it is much pleasanter and the ordinary driver would prefer, when using the car for pleasure, to have the pan 1 instead of a delivery or truck box, he will not make the change on account of the amount of labor involved.

However, with my improved construction it is the work of only a very few minutes and the change is made, without having to get under the car and dirty the clothes, so that the driver can at any time make a quick change from a pleasure car to a business car.

While I have described my invention and illustrated it in one particular design, I do not wish it understood that I limit myself to this construction, as it is evident that the application of the invention may be varied in many ways within the scope of the following claims:

1. In a detachable body lock for an automobile, the combination with the chassis thereof having a member with an aperture therein, of a pair of hooks adapted to be fastened to the chassis, one on each side thereof, and near the rear end thereof, and a pair of fingers adapted to be fastened to a detachable body, to engage with said hooks, and an engaging lip adapted to be carried on the bottom of said detachable body to register with the aperture in said chassis, and a hinge adapted to be fastened to said detachable body and having a lip adapted to engage under a portion of the chassis to prevent upward movement of the body to which the hinge is attached.

2. In a detachable body lock for an automobile, the combination with the chassis thereof having a member with an aperture therein, of a pair of hooks adapted to be fastened to the chassis, one on each side thereof, and near the rear end thereof, and a pair of fingers adapted to be fastened to a detachable body, to engage with said hooks, and an engaging lip adapted to be carried on the bottom of said detachable body to register with the aperture in said chassis, and a hinge adapted to be fastened to said detachable body and having a lip adapted to engage under a portion of the chassis to prevent upward movement of the body to which the hinge is attached, and spring means for normally holding said lip in engagement with said chassis when the body is in position on said chassis.

3. In a detachable body lock, the combination with the chassis of a car and a detachable box for the rear end thereof, of a pair of hooks, one positioned on each side of said chassis, a pair of fingers, one positioned on each side of said box, said fingers and hooks being mounted for engagement, one with the other, when the body is carried on the chassis, a downwardly projecting lip carried on the bottom of said box and adapted to register in an aperture on the top of the chassis, the side of said aperture being reinforced with sheet metal, a hinge positioned on the bottom of said box and having a lip adapted to engage under a portion of the chassis to prevent upward movement of said box with respect to said chassis.

4. In a detachable body lock, the combination with the chassis of a car and a detachable box for the rear end thereof, of a pair of hooks, one positioned on each side of said chassis, a pair of fingers, one positioned on each side of said box, said fingers and hooks being mounted for engagement, one with the other, when the body is carried on the chassis, a downwardly projecting lip carried on the bottom of said box and adapted to register in an aperture on the top of the chassis, the side of said aperture being reinforced with sheet metal, a hinge positioned on the bottom of said box and having a lip adapted to engage under a portion of the chassis to prevent upward movement of said box with respect to said chassis, and spring means for holding said lip hinge in position with respect to said chassis.

5. In a detachable body lock, the combination with the chassis of a car and a detachable box for the rear end thereof, of a pair of hooks, one positioned on each side of said chassis, a pair of fingers, one positioned on each side of said box, said fingers and hooks being mounted for engagement, one with the other, when the body is carried on the chassis, a downwardly projecting lip carried on the bottom of said box and adapted to register in an aperture on the top of the chassis, the side of said aperture being reinforced with sheet metal, a hinge position on the bottom of said box and having a lip adapted to engage under a portion of the chassis to prevent upward movement of said box with respect to said chassis, and spring means for holding said lip hinge in position with respect to said chassis, and means extending from a portion of said hinge to a position near the end of said box so said hinge may be drawn from out of engagement with said chassis to facilitate the removal of said box.

WILLIAM N. BAER.